(12) United States Patent
Stauder et al.

(10) Patent No.: US 12,196,308 B2
(45) Date of Patent: Jan. 14, 2025

(54) TRANSMISSION ASSEMBLY WITH MORE THAN ONE REDUCTION RATIO AND METHOD FOR OPERATING A TRANSMISSION ASSEMBLY

(71) Applicant: Continental Automotive Technologies GmbH, Hannover (DE)

(72) Inventors: Peter Stauder, Mainz (DE); Miroslav Kajic, Frankfurt am Main (DE); Mathias Haag, Darmstadt (DE); Jürgen Balz, Huenstetten Oberlibbach (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/422,261

(22) Filed: Jan. 25, 2024

(65) Prior Publication Data

US 2024/0247716 A1   Jul. 25, 2024

(30) Foreign Application Priority Data

Jan. 25, 2023  (DE) ..................... 10 2023 200 574.3

(51) Int. Cl.
*F16H 57/08* (2006.01)
*F16H 3/66* (2006.01)

(52) U.S. Cl.
CPC ........... *F16H 57/082* (2013.01); *F16H 3/663* (2013.01); *F16H 2200/2097* (2013.01)

(58) Field of Classification Search
CPC ......... F16H 2200/2005; F16H 3/52–62; F16H 2200/2035; F16D 65/16–46; F16D 2125/50

See application file for complete search history.

(56) References Cited

U.S. PATENT DOCUMENTS

| | | | |
|---|---|---|---|
| 9,637,127 B1* | 5/2017 | Cooper | ............... B60W 10/115 |
| 2007/0049453 A1 | 3/2007 | Nagai et al. | |
| 2009/0270220 A1 | 10/2009 | Fukano et al. | |
| 2011/0278109 A1 | 11/2011 | No | |
| 2014/0000993 A1* | 1/2014 | No | ......................... F16D 65/18 |
| | | | 188/72.8 |
| 2016/0221555 A1 | 8/2016 | Rehfus | |
| 2018/0244143 A1 | 8/2018 | Gollmer et al. | |

(Continued)

FOREIGN PATENT DOCUMENTS

| | | |
|---|---|---|
| CN | 113787999 A | 12/2021 |
| DE | 3840685 A1 | 6/1990 |
| DE | 102009018356 A1 | 10/2009 |

(Continued)

OTHER PUBLICATIONS

Raw translation of "EP0372219A2", Steinke, Wheel Brake For Vehicle, Jun. 13, 1990, 24 pages. (Year: 1990).*

(Continued)

*Primary Examiner* — Ernesto A Suarez
*Assistant Examiner* — Lillian T Nguyen

(57) ABSTRACT

A transmission assembly has more than one reduction ratio. For this purpose, the transmission assembly can comprise a planetary transmission in which the annulus can rotate freely in a first position and in which the annulus is held fixed against rotation in a second position. A method of operating a transmission assembly is also disclosed.

10 Claims, 3 Drawing Sheets

(56) References Cited

U.S. PATENT DOCUMENTS

2019/0120351 A1* 4/2019 Cho .................. F16H 3/006
2021/0394602 A1* 12/2021 Schilder ............... B60K 1/00

FOREIGN PATENT DOCUMENTS

| DE | 102006039652 B4 | 9/2010 |
| DE | 102015221779 A1 | 5/2017 |
| EP | 0372219 B1 | 12/1992 |

OTHER PUBLICATIONS

German Search Report dated Dec. 11, 2023 for the German Patent Application No. 10 2023 200 574.3 for which this application claims priority.

* cited by examiner

TRANSMISSION ASSEMBLY WITH MORE THAN ONE REDUCTION RATIO AND METHOD FOR OPERATING A TRANSMISSION ASSEMBLY

TECHNICAL FIELD

The present embodiments related in general to a transmission assembly having more than one reduction ratio and to a method for operating a transmission assembly.

BACKGROUND

In modern motor vehicles, increasing use is being made of electromechanical service brakes ("EMB") as opposed to conventional, hydraulically actuated, service brakes. Thus, there is no longer a need for a complex hydraulic system, and an electromechanical service brake also takes up significantly less space.

Electromechanical service brakes of this kind typically have an electronic drive unit, which interacts with a transmission. Arranged on the output side of the transmission is a brake unit, which comprises a friction lining that acts on a brake disk.

A certain clearance must be provided between the friction lining and the brake disk to ensure that there is no rubbing on the brake during free, unbraked driving, something that can lead to the brake running hot. This minimum clearance is also referred to as a release clearance. This release clearance should be dimensioned in such a way that even slight wobbling of the brake disk cannot lead to rubbing during free driving, which could lead in turn to unequal wear on the brake disk. This may lead to changes in the braking torque. Moreover, consideration must also be given to potential heating of the brake unit, which can lead to expansion, e.g. of the brake disk.

The release clearance should therefore be configured in such a way that the possible operating conditions for the brake unit are covered. With a view also to the greatest possible reduction in the residual braking torque by the brake unit, the release clearance is therefore always designed to be relatively large and can quite easily be 1 mm or even more when the brake is cold.

In addition, there is the fact that both the friction or brake lining and the brake disk may wear by different amounts during the operation of the motor vehicle, and this may even increase a preset release clearance.

The electronic drive unit often comprises at least one permanently excited DC motor, which has a high power density, wherein the mechanical connection to the friction brake is established by means of the transmission. In addition to factors such as efficiency, installation space requirement and stiffness, it is above all the transmission characteristic which determines the suitability of the transmission.

If the transmission has a linear transmission ratio or constant transmission ratio an increasingly long distance, predetermined by the release clearance, must be traversed before the desired physical effect, in particular the buildup of the desired clamping force for pressing the friction lining onto the brake disk, comes into action. A longer brake application distance has an effect on the force buildup and force modulation, i.e. the desired braking effect occurs only after a time delay, for example.

SUMMARY

Therefore, transmissions with a nonlinear transmission ratio recommend themselves. In the case of a nonlinear component, the transmission ratio can be increased in the region of the release clearance, and thus a more rapid response time and a somewhat lower required input power with a lower torque can be achieved. Since a continuous change in the transmission ratio is used in the case of the known nonlinear rotation-translation converters, the possible travel is limited, however. Furthermore, the initial position from which the nonlinear transmission ratio takes effect must be known. Moreover, an additional means of adjustment for wear has to be provided to ensure that the working range does not change over the service life.

Accordingly, an electromechanical braking device which does not have or at least mitigates the abovementioned is desirable.

The aim is therefore an electromechanical wheel brake or a transmission assembly suitable for such a brake which allows the release clearance to be traversed quickly. In this case, dependence on the initial position from which the change in transmission ratio takes effect should be as low as possible.

At the same time, however, it should also be ensured that a sufficiently high brake application force can be made available quickly and reliably upon contact between the friction linings and the brake disk.

In addition, for reasons of installation space and cost, there should be no need for a second rotation-translation converter.

This object may be achieved by a transmission assembly having at least a first and a second reduction ratio, for example for a wheel brake for a motor vehicle, and by a method for operating a wheel brake for a motor vehicle according to one of the independent claims.

In a first aspect, a transmission assembly having at least a first and a second reduction ratio, for example for an electromechanical wheel brake for a motor vehicle, comprising a planetary transmission having a sun wheel, which is connected for conjoint rotation to a drive shaft. A number of planet wheels are rotatably mounted on a planet carrier, and an annulus surrounding the planet wheels, wherein the planet carrier is connected for conjoint rotation to an output shaft. The planet wheels are supported by means of the planet carrier in such a way that they can roll both on the sun wheel and on the annulus. During operation, the annulus can rotate freely in a first position and is held fixed against rotation in a second position. A clutch is provided between the drive shaft and the planet carrier.

A motor vehicle may refer to a vehicle that has axles, wherein at least one of these axles comprises steerably guided wheels and, furthermore, the driving of the wheels on at least one axle can be adapted in a wheel-specific manner.

In this case, the brake may be designed as an electromechanical wheel brake, wherein for example all the wheel brakes of the motor vehicle can be designed as electromechanical or electrically controllable wheel brakes.

In this case, the electromechanical wheel brake may be designed as a service brake. However, it is also possible to use the transmission assembly in or with a parking brake.

In this case, the electromechanical wheel brakes can be embodied as electromechanical disk brakes, in which a brake application force can be produced by means of an electric motor, an auxiliary transmission and/or a rotation-translation mechanism. In this context, the brake application force refers to the force with which the brake linings are pressed against the brake disk. In operation, a corresponding braking torque is thereby produced at the wheel under consideration. Depending on the embodiment and control concept, the control system can be selected in such a way that either a predetermined, defined clamping force or a predetermined, defined braking torque is set in accordance with the deceleration demand requested.

The electromechanical wheel brakes can also be designed as an electromechanical drum brake, in which the motor/transmission unit actuates an expansion module, which presses the brake linings against the brake drum with an expansion force determined on the basis of the desired deceleration requested and thus produces a corresponding braking torque. Depending on the embodiment and control concept, the control system can be designed in such a way that a defined expansion force or a defined braking torque is set in accordance with the deceleration demand.

For simplification and better comprehension, the terms brake lining and brake disk are used below, but it will be apparent to a person skilled in the art that the embodiments of the transmission assembly which are described can be used not only for electromechanical disk brakes but also in or with an electromechanical drum brake.

Accordingly, a transmission assembly is provided which is designed at least with a first and a second reduction ratio.

According to an embodiment, the transmission assembly comprises a planetary transmission having a sun wheel, which is connected for conjoint rotation to a drive shaft and can be driven directly or indirectly by an electric motor or an electronic drive unit. Planetary transmissions are assumed to be fundamentally known to those skilled in the art and will therefore only be briefly outlined.

A planetary transmission typically furthermore comprises a number of planet wheels, which are mounted rotatably on a spider or planet carrier. The planet carrier is connected for conjoint rotation to the output shaft.

The planet wheels can roll on the sun wheel, for which purpose corresponding gearwheels can be provided. As an alternative, friction wheels are also possible. Furthermore, the planet wheels can likewise roll on a surrounding annulus. For this purpose too, corresponding toothing can be provided, or alternatively friction wheels.

During the operation of the transmission assembly, for example combination with an actuator for an electromechanical wheel brake for a motor vehicle, a force that acts in the axial direction on the output shaft may occur, and this then rises when the brake linings come into contact with the brake disk and are pressed against the brake disk.

For this purpose, the output shaft can, for example, comprise a ball screw drive, which enables the rotary motion of the output shaft to be converted into a translational motion. This translational motion, in turn, can be used to move a brake lining in the direction of the brake disk.

Accordingly, this axial force that arises is used to shift the transmission assembly from the at least first into the second reduction ratio.

Here, the first reduction ratio forms a rapid motion ratio in order to traverse the release clearance when braking during operation. The torque which must be applied during this process is relatively low and can, for example, be less than 5 Nm or even less than 1 Nm. Low means that it is less than the torque which occurs during active braking. In an embodiment, the magnitude of this torque can be, for example, 20% or less, e.g. 10% or 5%, of the torque which is required during an active braking process.

Accordingly, the first reduction ratio is used at lower torques or in a first, low torque range, in which essentially the release clearance is to be traversed and active braking is not yet taking place, i.e. the brake linings are still essentially out of contact with the brake disk.

For this purpose, the required torque is transmitted from the drive shaft to the output shaft via a clutch.

For this purpose, the design provides for the annulus to be in the first position and to be able to rotate freely in the surrounding housing, as can also the planet carrier. When the wheel brake is activated, the annulus accordingly initially rotates freely under no load, and the output of the planetary transmission is driven directly by the output by means of a clutch, for example a clutch which limits the torque.

The second reduction ratio is then used for a second torque range, in which a required torque for active braking must at least be made available in order to apply the required brake application force during the operation of the brake. Here, this torque is typically higher and is above the first torque range.

The further advance of the brake linings in the axial direction can lead to a counterforce on the output shaft, which is used in the design to move the annulus in the axial direction from the first to the second position. Accordingly, the annulus is moved from the first position in the direction of the sun wheel solely by the axial force and is prevented from rotating or held fixed against rotation when a defined, second position in the axial direction is reached.

The fixing of the annulus has the effect that the torque of the drive shaft is transmitted to the planet wheels via the sun wheel and no longer via the clutch. Since the planet wheels are also in effective interaction with the annulus, which is then stationary, and roll on the latter, this leads to rotation of the planet carrier and thus of the output shaft in accordance with the second reduction ratio.

For this purpose, the design provides for the annulus and/or the output shaft to have an axial mobility and for them to be able to move from a first to a second position.

To ensure this, the arrangements of the teeth provided in a tooth system between the sun wheel and the planet wheels and between the planet wheels and the annulus are parallel to the rotational axis of the planetary transmission. Corresponding rolling of these components on one another is also possible if the axis of rotation is parallel to the rotational axis of the transmission assembly.

When a predetermined axial force is reached during the operation of the wheel brake, the annulus is accordingly prevented from any further rotary motion. Holding the annulus fixed against rotation thus results in the use of the second reduction ratio of the planetary transmission.

Thus, an electromechanical wheel brake or a transmission assembly allows the release clearance to be traversed quickly and allows an improved response.

The transmission assembly operates freely from the initial position and makes it possible to switch between two reduction ratios in a purely mechanical way on the basis of the magnitude of an acting axial force.

In principle, it is also possible and conceivable to provide or integrate a sensor which records the current position of the drive shaft and/or the acting force. The sensors can thus comprise position sensors and/or force sensors. The sensor data can then be used, for example, to detect the changeover time or changeover location to enable a correct piston position to be calculated.

The transmission assembly ensures that, when the brake linings make contact with the brake disk, a sufficiently high brake application force can be made available quickly and reliably, thus enabling active braking to take place after the release clearance has been traversed.

In this case, the transmission assembly requires only slight modifications to existing transmission assemblies and, as a result, can be integrated easily and cheaply into existing braking devices.

According an embodiment, the planet carrier can have an axially projecting neck, which can enclose or surround at least a section of the drive shaft. The clutch can advantageously be arranged between the inner surface of the neck and the outer lateral surface of the drive shaft.

The clutch serves for direct transmission of the drive torque to the planet carrier. In this way, a first reduction ratio of about 1:1 can be achieved in the direct drive mode of the transmission assembly. In the second torque range, a second reduction ratio of, for example, 1:5 to 1:8 can then be achieved.

According to an embodiment, the clutch is designed as an "overload clutch". This means that, when a predetermined torque is reached, the output can be separated from the input or acts to only a slight extent. In order, as far as possible, to lose no driving energy due to the clutch in the second torque range, in which active braking takes place.

According to another embodiment, the clutch can also comprise a friction clutch, for example. The friction clutch can be designed in such a way, for example, that it applies a predetermined static friction to the drive shaft when it is firmly connected to the planet carrier or to the planet carrier when it is firmly connected to the drive shaft.

In a development of this embodiment, provision is made to combine the clutch with a freewheel in such a way that the clutch is in engagement only during the advance of the brake, and not during release. Thus, no additional torque has to be produced during release.

Accordingly, the clutch is designed as a physically solid element and thus is not a viscous medium or fluid, i.e. the clutch is in a solid state of aggregation at a temperature of 20° C.

According to an embodiment, an axial bearing is furthermore provided, via which an axial force can be applied to the annulus. The axial bearing thus ensures that, when the annulus is held fixed against rotation, the output shaft can continue to rotate.

The output shaft can, for example, comprise a radial projection, which can run parallel to the side wall of the annulus. The axial bearing can then be arranged between this projection and the side wall. The axial bearing can comprise a rolling bearing or a ball bearing, for example, although other embodiments are also conceivable and possible.

An aspect can be considered that the annulus is supported in such a way as to be movable in an axial direction relative to a surrounding housing. In other words, the annulus can adopt a first position in the axial direction and a second position in the axial direction, depending on the reduction ratio.

Here, the first position corresponds to the position in which the annulus is mounted in a freely rotatable manner and in which the first reduction ratio can be implemented during operation. This first position thus also corresponds to the first torque range.

The second position then corresponds to the position in which the annulus is braked or held fixed against rotation and in which the second reduction ratio can be implemented during operation. This second position thus also corresponds to the second torque range.

According to an embodiment, the annulus can be connected frictionally and/or positively to the housing in the second position. For this purpose, it is possible, for example, for the face side of the annulus to be pressed against the housing or a stop of the housing in the case of or by the applied axial force, thus inhibiting rotation of the annulus. For this purpose, the face side of the annulus and/or the contact region of the housing can be designed with a friction lining, which produces a high static friction.

Alternatively or in addition, it is also possible to provide a positive connection, in which, for example, extensions or pins are provided which can engage in sockets of precisely mating design.

Toothing is also possible and contemplated. This can also be implemented, for example, by means of teeth on the outer circumferential surface of the annulus, which can engage in mating teeth on the inner wall of the housing.

In a development, a spring or a spring element is provided. This is intended to move the annulus back into the first position if the axial force diminishes, e.g. owing to a reduction in the braking demand. The spring can be designed, for example, as a tension spring, which is tensioned when acted upon by the motor torque. The use of a compression or torsion spring is likewise possible too.

A further aspect also includes an electromechanical wheel brake comprising a transmission assembly as described above. The electromechanical wheel brake can be used as a service brake. Use as a parking brake is also possible.

Yet another further aspect, also includes a method for operating an electromechanical wheel brake of a motor vehicle, comprising an electric motor and a transmission assembly as described above.

BRIEF DESCRIPTION OF THE DRAWINGS

Further details of the embodiments will become apparent from the description of the illustrated exemplary embodiments and the attached claims.

In the drawings.

DETAILED DESCRIPTION

In the following detailed description of embodiments, for the sake of clarity, the same reference signs designate substantially identical parts in or on these embodiments. However, for better clarification, the embodiments illustrated in the figures are not always drawn to scale.

For reasons of clarity, only those elements of the wheel brake 100 which are relevant for the embodiment of the approach are illustrated here.

Figure 1:
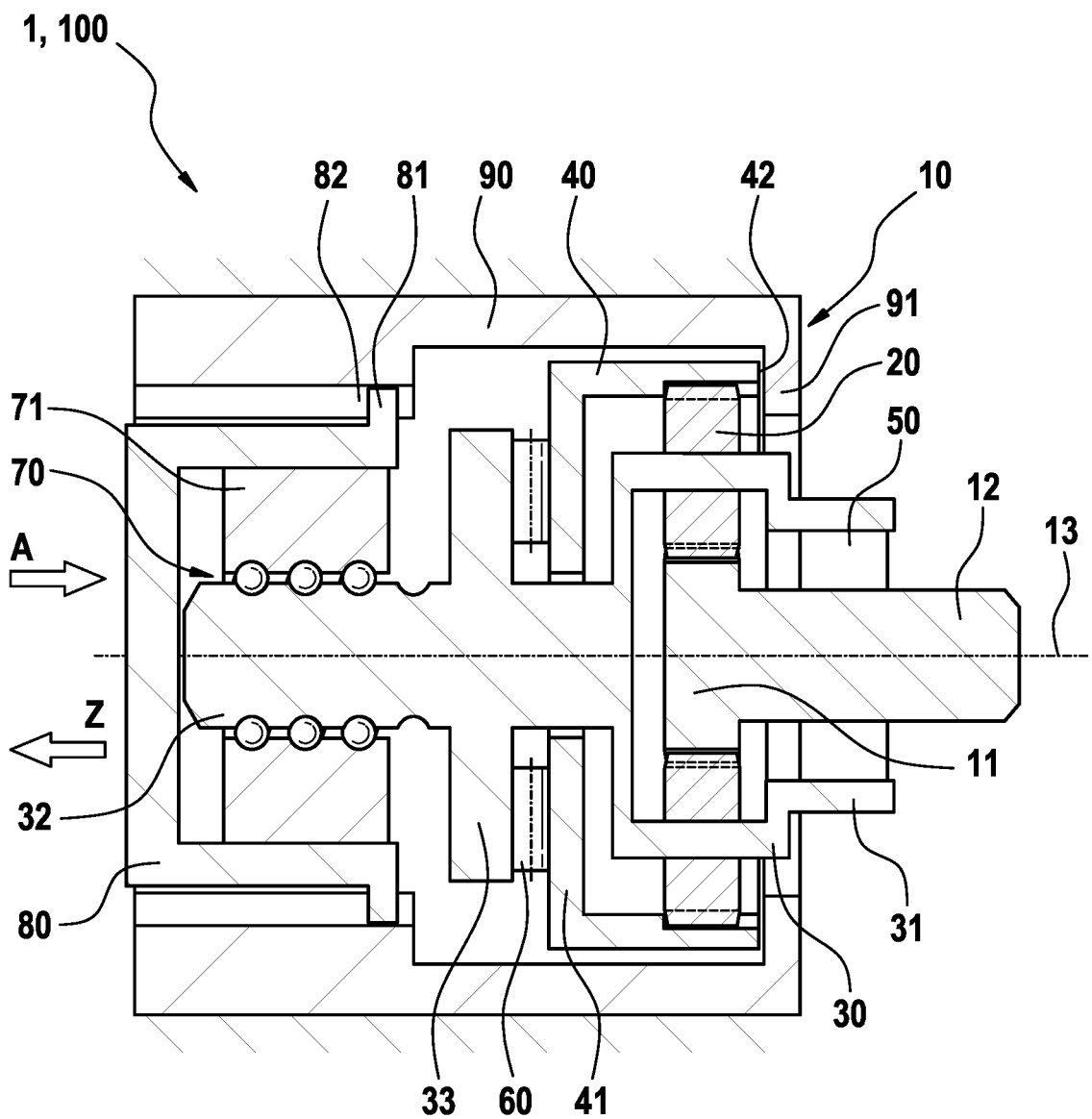
FIG. 1 shows a schematic view of a transmission assembly in section.

FIG. 1 shows a view of a transmission assembly 1 as part of an electromechanical wheel brake 100 in a longitudinal section with some essential elements, although there is no claim to completeness.

The transmission assembly 1 is designed with at least a first and a second reduction ratio and comprises a planetary transmission 10 having a sun wheel 11, which is connected for conjoint rotation to a drive shaft 12, a number of planet wheels 20, which are rotatably mounted on a planet carrier 30, and an annulus 40 surrounding the planet wheels 20. The planet carrier 30 is connected for conjoint rotation to an output shaft 32, wherein the planet wheels 20 are supported by means of the planet carrier 30 in such a way that they can roll both on the sun wheel 11 and on the annulus 40. During operation, the annulus 40 can rotate freely in a first position and is held fixed against rotation in a second position. A clutch 50 is provided between the drive shaft 12 and the planet carrier 30.

In the present case, the example shown is a schematic view of a segment of an electromechanical disk brake, although the transmission assembly 1 can also be used for or together with an electromechanical drum brake.

The assembly shown in the exemplary embodiment provides for a brake application force to be produced by means of an electric motor or an electronic drive unit (not illustrated). For this purpose, the torque produced by the electric motor is first of all transmitted to the drive shaft 12 of the planetary transmission 10. The sun wheel 11 is connected for conjoint rotation to the drive shaft 12. The drive shaft 12 and the sun wheel 11 can, for example, be manufactured in one piece or can be assembled from individual components and connected to one another in an appropriate manner for conjoint rotation.

The planetary transmission 10 furthermore comprises a number of planet wheels 20, of which two are depicted in the exemplary embodiment and which are mounted rotatably on a planet carrier 30, also referred to as a spider. Finally, the planet wheels 20 are surrounded in a known manner by an annulus 40. The sun wheel 11, planet carrier 20 and annulus 40 can roll on one another. In the exemplary embodiment, they are in effective connection with one another via toothing.

The planet carrier 30 is in turn connected for conjoint rotation to the output shaft 32.

In this case, the planet carrier 30 and the output shaft 32 can, for example, be manufactured in one piece or can be assembled from individual components and connected to one another in an appropriate manner for conjoint rotation.

The output shaft 32 is in engagement with a ball screw drive 70. Instead of a ball screw drive, it is also possible to use a spindle or a rack. If a spindle is used, it may also be possible to enable a parking brake function with self locking. By means of a spindle nut 71, a braking element 80 can be moved in translation in the axial direction during operation. The braking element 80 can be part of an electromechanically actuated floating caliper brake and can, for example, comprise a pressure piston or brake piston. The braking element 80 is designed with a rotation prevention means 81, which can engage in a corresponding undercut 82.

During the operation of the electromechanical wheel brake 100, a brake application force is applied, which acts on the braking element 80 in the direction denoted by "Z". In operation, a corresponding braking torque can thereby be produced at the wheel under consideration. Before the braking element 80 comes into contact with the brake disk during operation, the release clearance first of all has to be traversed in the axial direction.

After the release clearance has been traversed or upon contact of the braking element 80 with the brake disk, an axial force in the opposite direction is produced, indicated by "A" in the figure, and this may then rise when the brake lining comes into contact with the brake disk.

This axial force is used to shift the transmission assembly from the at least first into the second reduction ratio. The assembly shown in FIG. 1 exhibits a state of the transmission with a position of the annulus 40 in accordance with the second reduction ratio, in which the annulus 40 is accordingly braked or held fixed against rotation.

Here, the first reduction ratio forms a rapid motion ratio in order to traverse the release clearance when braking or at the beginning of a braking process during operation. The torque which must be applied during this process is lower than the torque which must be applied during active braking. In an embodiment, the magnitude of this torque can be, for example, 20% or less, e.g. 10% or 5%, of the torque which is required during an active braking process.

In the first torque range, as it were during the advance of the wheel brake, the torque is transmitted via the clutch 50 from the drive shaft 12 to the planet carrier 30 and thus to the output shaft 32 connected for conjoint rotation. For this purpose, the annulus 40 and the planet carrier 30 can rotate freely in the surrounding housing 90 in the first position and are thus as it were functionless. The output of the planetary transmission 10 is driven directly by the drive with the aid of the clutch 50.

In other words, the braking element 80 is moved in the brake application direction Z. A further advance then leads to the counterforce on the output shaft 32 in the direction A, which leads to an axial movement of the output shaft in direction A. The annulus 40 is thereby moved in the axial direction as far as the second position, which is depicted in FIG. 1. For this purpose, the annulus 40 and the output shaft 32 have an axial mobility and can move from a first into a second position depending on the acting axial force.

In order to ensure this, the teeth by means of which the sun wheel 11, the planet wheels 20 and the annulus 12 are in effective connection are designed in such a way as to be aligned parallel to the rotational axis 13. In this way, axial movement without radial misalignment is possible without problems, even when the teeth are intermeshing. Corresponding rolling of the components on one another is also conceivable and possible instead of the teeth if the axis of rotation is parallel to the rotational axis 13 of the transmission assembly 1.

In the second position, the annulus 40 is accordingly prevented from performing a rotary motion during the operation of the wheel brake. Braking or holding the annulus 40 fixed against rotation thus brings the second reduction ratio of the planetary transmission 10 into use.

Thus, an electromechanical wheel brake 100 or a transmission assembly 1 allows the release clearance to be traversed quickly and thus allows an improved response.

In the embodiment shown in FIG. 1, the planet carrier 30 has an axially projecting neck 31, which surrounds the drive shaft 12. The clutch 50 is arranged between the inner surface of the neck 31 and the outer lateral surface of the drive shaft 12.

For this purpose, the inner surface of the neck 31 or the drive shaft 12 can also have a recess or cutouts (not illustrated) in order to hold or receive the clutch 50 in a fixed manner in the axial direction.

The clutch 50 serves for direct transfer of the drive torque to the planet carrier 30 in the first torque range up to a predetermined torque. In this way, a reduction ratio of about 1:1 can be achieved in the direct drive mode of the transmission assembly 1.

According to an embodiment, the clutch 50 is designed as an "overload clutch". This makes it possible to ensure that as far as possible no driving energy is lost due to the clutch 50 in the second torque range, in which active braking takes place.

According to another embodiment the clutch 50 can also comprise a friction clutch, as indicated in FIG. 1. For this purpose, the clutch 50 is of annular design and surrounds the drive shaft in the exemplary embodiment. The friction clutch can apply a predetermined static friction to the drive shaft 12 when it is firmly connected to the planet carrier 30 or to the planet carrier 30 when it is firmly connected to the drive shaft 12.

A magnetic clutch, which can be based on a magnetic reluctance torque and which shifts or changes over above a defined torque, is also possible and contemplated.

As shown in FIG. 1, an axial bearing 60, via which the axial force can be applied by the output shaft 32 to the annulus 40, is furthermore provided. When the annulus 40 is braked or held fixed against rotation, the axial bearing 60 ensures that the output shaft can continue to rotate.

In the exemplary embodiment, the output shaft 32 has a radial projection 33 for this purpose, said projection running parallel to the side wall 41 of the annulus 40. When an axial force is applied, the annulus 40 can then be supported against the projection 33 in the axial direction, as shown in FIG. 1.

In the exemplary embodiment, the axial bearing 60 is shown as a cylindrical roller bearing, that is to say as a rolling bearing, but it can also be designed as a ball bearing, for example.

According to one embodiment, which is shown only indicatively in FIG. 1, provision is made for braking or holding the annulus 40 fixed against rotation in the second position by the fact that the face side 42 of the annulus 40 is in effective interaction with a fixed stop 91 of the housing 90.

For this purpose, the stop 91 and/or the face side 42 can, for example, be provided with corresponding friction linings, which bring about a high static friction when pressed onto one another and in this way inhibit or brake rotation of the annulus 40.

Alternatively or in addition, it is possible to provide elements which can bring about positive engagement in the region of the contact surface. For this purpose, the face side 42 of the annulus 40 and/or the contact region of the housing 90 or the stop 91 can have extensions or pins which can engage in sockets of precisely mating design in the second position.

Toothing is also possible. This can also be implemented, for example, by means of teeth arranged in the axial direction on the outer circumferential surface of the annulus, which can engage in mating teeth on the inner wall of the housing.

Accordingly, the annulus can be connected frictionally and/or positively to the housing in the second position. Care should be taken here to ensure that this connection can be released again easily without force when the axial force decreases. This enables the annulus to return to its initial or first position again when the braking process is ended.

In order to assist even further the return process of the annulus from the second to the first position, a spring or a spring element (not illustrated) is provided according to a development. This is intended to move the annulus back into the first position if the axial force diminishes, e.g. owing to a reduction in the braking demand. The spring can be designed, for example, as a tension spring, which is tensioned as a function of an acting torque. The use of a compression spring or, for example, a torsion spring, which is arranged between the annulus 40 and the housing 90, is likewise also possible. By means of a torsion spring, it is possible, for example, to limit the maximum free angle of rotation of the annulus 40.

By using a spring, it is also possible to limit the forward stroke, i.e. the axial movement of the annulus 40 when subject to a torque, e.g. to the nominal release clearance distance. This can be useful for the accuracy with which the position of the brake piston is determined.

Figure 2:
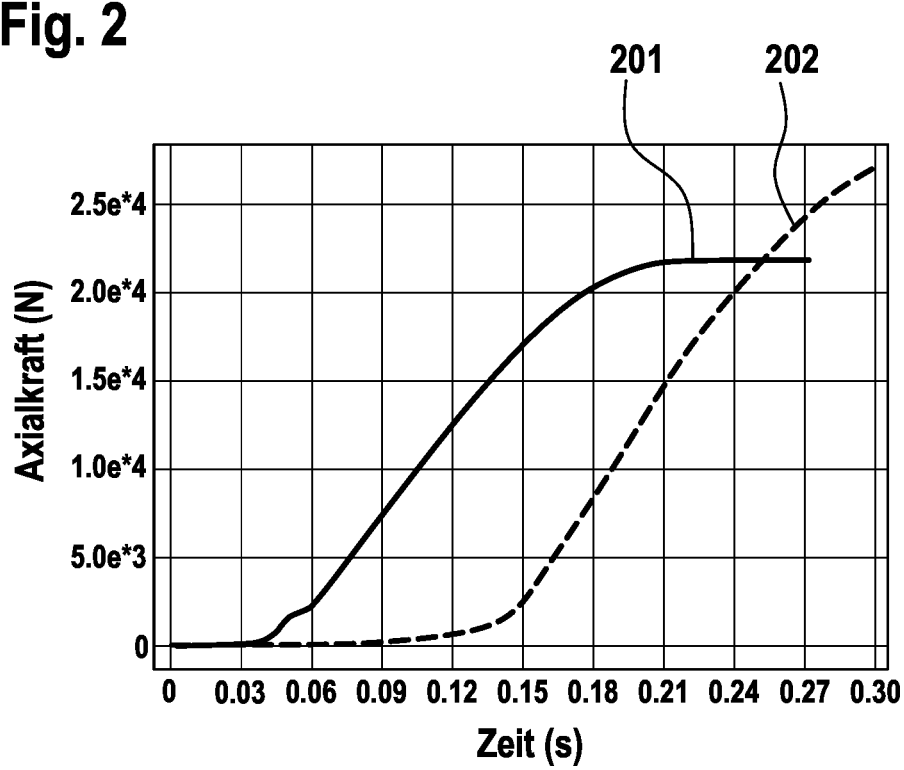
FIG. 2 shows, in a diagram, the characteristic of the axial force as a function of time during a braking process of a transmission assembly in comparison with a transmission assembly from the prior art.

FIG. 2 shows, by means of a diagram, the characteristic of the axial force F as a function of time during a braking process of a transmission assembly in comparison with a transmission assembly from the prior art. It is clearly apparent that the axial force 201 rises significantly earlier in a transmission assembly 1 than the axial force 202 in a transmission assembly from the prior art. In the exemplary embodiment shown, the axial force in the transmission assembly 1 rises continuously from about 0.04 s to a certain point and then ceases to rise. From this time, in the example at about 0.21 s, the annulus is held fixed against rotation, and the transmission assembly 1 acts with the second reduction ratio.

Figure 3:
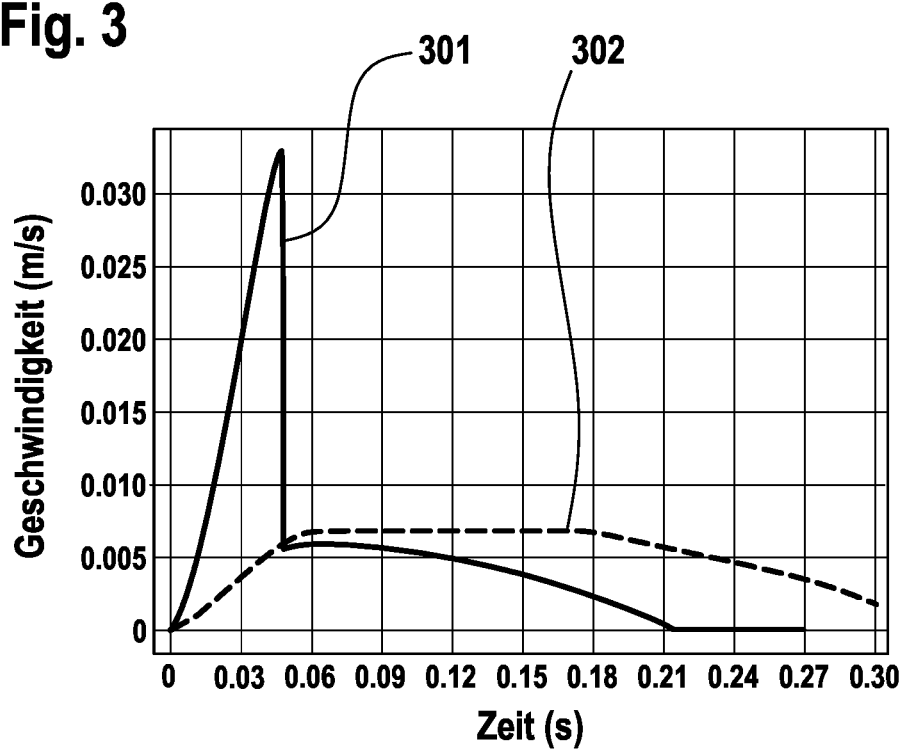
FIG. 3 shows, in a diagram, the characteristic of the brake piston speed as a function of time during a braking process of a transmission assembly in comparison with a transmission assembly from the prior art.

FIG. 3 shows, in a diagram, the characteristic of the brake piston speed as a function of time during a braking process of a transmission assembly in comparison with a transmission assembly from the prior art. The characteristic of the brake piston speed in a transmission assembly 1 is plotted with the reference sign 301, and the characteristic of the brake piston speed in an assembly from the prior art is plotted with the reference sign 302.

Figure 4:
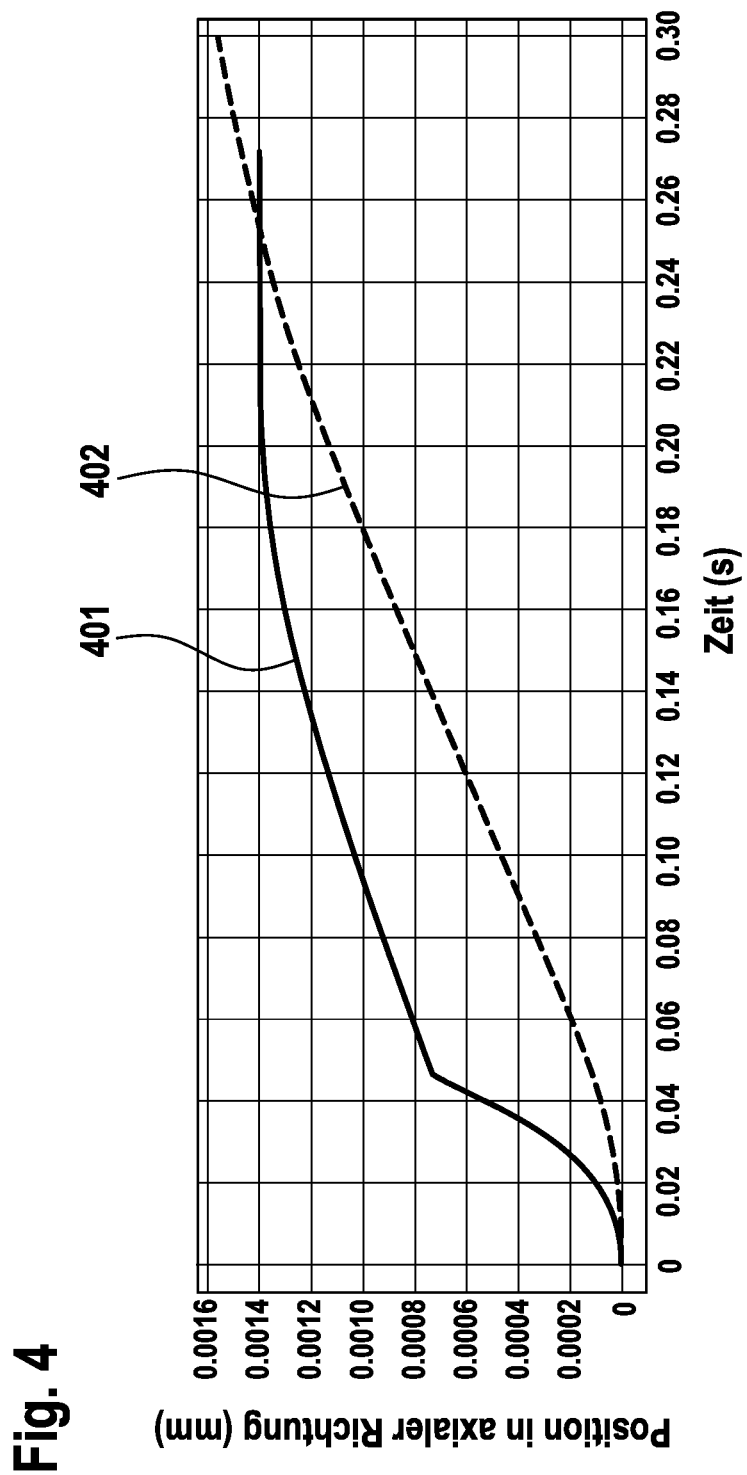
FIG. 4 shows, in a diagram, the change in the position of a braking element as a function of time during a braking process of a transmission assembly in comparison with a transmission assembly from the prior art.

FIG. 4 shows, in a diagram, the change in the position of a braking element in the axial direction as a function of time during a braking process of a transmission assembly according to the invention in comparison with a transmission assembly from the prior art. The position in a transmission assembly 1 is plotted with the reference sign 401, and the position in an assembly from the prior art is plotted with the reference sign 402. Here too, it is found that, in the transmission assembly 1, the position of the braking element from which active braking takes place is reached after only about 0.21 s, whereas this position is reached only after about 0.25 s following the initiation of the braking process in a transmission assembly from the prior art.

The embodiments may include an electromechanical wheel brake 100, in for example for a motor vehicle, comprising a transmission assembly 1 as described above. The electromechanical wheel brake 100 can be used as a service brake. Use as a parking brake is also possible.

Yet another further aspect also includes a method for operating an electromechanical wheel brake 100 of a motor vehicle.

The invention claimed is:

1. A transmission assembly for an electromechanical wheel brake for a motor vehicle comprising:
   a planetary transmission having a sun wheel, which is connected for conjoint rotation to a drive shaft, a number of planet wheels, which are rotatably mounted on a planet carrier, and an annulus surrounding the planet wheels;
   wherein the planet carrier is connected for conjoint rotation to an output shaft;
   wherein the planet wheels are supported by the planet carrier in such a way that they can roll both on the sun wheel and on the annulus;
   wherein the annulus can rotate freely in a first position and is held fixed against rotation in a second position during operation of the transmission assembly such that the transmission assembly has at least a first and a second reduction ratio;

a clutch is provided between the drive shaft and the planet carrier; and an axial bearing via which an axial force acting on the output shaft can be applied to the annulus.

2. The transmission assembly as claimed in claim 1, wherein, in the first position, the torque can be transmitted from the drive shaft to the output shaft via the clutch, wherein the clutch is designed as a physically solid element.

3. The transmission assembly as claimed in claim 1 wherein, in the second position, the torque can be transmitted from the drive shaft to the planet wheels via the sun wheel.

4. The transmission assembly as claimed in claim 1, wherein the clutch is designed as an overload clutch or as a friction clutch.

5. The transmission assembly as claimed in claim 1, wherein the annulus is supported in such a way as to be movable in an axial direction relative to a surrounding housing.

6. The transmission assembly as claimed in claim 1, wherein toothing is provided between the sun wheel, the planet wheels and/or the annulus, wherein the teeth are arranged parallel to the rotational axis.

7. The transmission assembly as claimed in claim 1, wherein, in the second position, the annulus is connected frictionally and/or positively to a housing or a stop.

8. An electromechanical wheel brake for a motor vehicle transmission assembly comprising:

a planetary transmission having a sun wheel, which is connected for conjoint rotation to a drive shaft, a number of planet wheels, which are rotatably mounted on a planet carrier, and an annulus surrounding the planet wheels;

wherein the planet carrier is connected for conjoint rotation to an output shaft;

wherein the planet wheels are supported by the planet carrier in such a way that they can roll both on the sun wheel and on the annulus;

wherein the annulus can rotate freely in a first position and is held fixed against rotation in a second position during operation of the transmission assembly such that the transmission assembly has at least a first and a second reduction ratio;

a clutch is provided between the drive shaft and the planet carrier; and an axial bearing via which an axial force acting on the output shaft can be applied to the annulus.

9. The electromechanical wheel brake as claimed in claim 8, designed as a service brake and/or as a parking brake.

10. A method for operating an electromechanical wheel brake of a motor vehicle comprising:

a rotatably mounting planet wheels on a planet carrier in such a way that they can roll both on a sun wheel and on a annulus;

connecting the planet carrier for conjoint rotation to an output shaft;

rotating the annulus can rotate freely in a first position; and holding the annulus fixed against rotation in a second position during operation of the transmission assembly such that the transmission assembly has at least a first and a second reduction ratio; and applying an axial force to the output shaft via an axial bearing wherein the axial force can be applied to the annulus.

* * * * *